US012328729B2

(12) United States Patent
Liu et al.

(10) Patent No.: US 12,328,729 B2
(45) Date of Patent: Jun. 10, 2025

(54) BUFFER STATUS REPORTING METHOD, RELAY TERMINAL DEVICE, AND COMPUTER-READABLE STORAGE MEDIUM

(71) Applicant: VIVO MOBILE COMMUNICATION CO., LTD., Guangdong (CN)

(72) Inventors: Jiamin Liu, Guangdong (CN); Xiaodong Yang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 409 days.

(21) Appl. No.: 17/893,259

(22) Filed: Aug. 23, 2022

(65) Prior Publication Data

US 2022/0408466 A1 Dec. 22, 2022

Related U.S. Application Data

(63) Continuation of application No. PCT/CN2021/077540, filed on Feb. 24, 2021.

(30) Foreign Application Priority Data

Feb. 24, 2020 (CN) .......................... 202010113966.1

(51) Int. Cl.
*H04W 72/21* (2023.01)
*H04W 72/23* (2023.01)
*H04W 72/566* (2023.01)

(52) U.S. Cl.
CPC .......... *H04W 72/21* (2023.01); *H04W 72/23* (2023.01); *H04W 72/569* (2023.01)

(58) Field of Classification Search
CPC .... H04W 72/21; H04W 72/569; H04W 72/23
USPC ......................................................... 370/329
See application file for complete search history.

(56) References Cited

U.S. PATENT DOCUMENTS

| 11,470,635 B2 * | 10/2022 | Xu ........................ H04W 72/23 |
| 2006/0072512 A1 | 4/2006 | Das et al. |
| 2009/0196177 A1 | 8/2009 | Teyeb et al. |
| 2011/0269393 A1 | 11/2011 | Östergaard et al. |

(Continued)

FOREIGN PATENT DOCUMENTS

| CN | 101933296 A | 12/2010 |
| CN | 102045851 A | 5/2011 |

(Continued)

OTHER PUBLICATIONS

Zhu et al., U.S. Appl. No. 62/976,257, all pages (Year: 2020).*

(Continued)

*Primary Examiner* — Anthony Mejia
(74) *Attorney, Agent, or Firm* — BROOKS KUSHMAN P.C.

(57) ABSTRACT

A buffer status reporting method, a relay terminal device, and a computer-readable storage medium are provided. The buffer status reporting method includes: determining data information of to-be-transmitted data, where the to-be-transmitted data is data which is about to be sent by a remote terminal device to a network device through a relay terminal device; generating a target buffer status report based on the data information, where the target buffer status report is a to-be-sent buffer status report; and reporting the target buffer status report to the network device.

20 Claims, 5 Drawing Sheets

(56) References Cited

U.S. PATENT DOCUMENTS

| | | | | |
|---|---|---|---|---|
| 2017/0353819 A1* | 12/2017 | Yin | ...................... | H04W 72/21 |
| 2020/0029353 A1* | 1/2020 | Xu | ........................ | H04W 72/21 |
| 2020/0045577 A1 | 2/2020 | Yu et al. | | |
| 2021/0258823 A1* | 8/2021 | Zhu | ................... | H04W 28/0263 |
| 2023/0156471 A1* | 5/2023 | Trivellato | ........... | H04W 12/128 |
| | | | | 370/329 |

FOREIGN PATENT DOCUMENTS

| | | |
|---|---|---|
| CN | 108370561 A | 8/2018 |
| CN | 110113781 A | 8/2019 |
| CN | 111148147 A | 5/2020 |
| CN | 111586751 A | 8/2020 |
| EP | 2250769 | 11/2010 |
| EP | 3512276 A1 | 9/2016 |
| WO | 2009095814 A1 | 8/2009 |
| WO | 2016177221 A1 | 11/2016 |
| WO | 2018058684 A1 | 4/2018 |
| WO | 2019062594 A1 | 4/2019 |

OTHER PUBLICATIONS

First Office Action for Chinese Application No. 202010113966.1, dated Sep. 2, 2022, 11 Pages.
International Search Report and Written Opinion for Application No. PCT/CN2021/077540, dated May 14, 2021, 10 Pages.
Extended European Search Report for Application No. 21760204.4-1215, dated May 17, 2023, 8 Pages.

* cited by examiner

BUFFER STATUS REPORTING METHOD, RELAY TERMINAL DEVICE, AND COMPUTER-READABLE STORAGE MEDIUM

CROSS-REFERENCE TO RELATED APPLICATIONS

This application is a continuation application of International Application No. PCT/CN2021/077540 filed on Feb. 24, 2021, which claims priority to Chinese Patent Application No. 202010113966.1, filed on Feb. 24, 2020 which are incorporated herein by reference in their entireties.

TECHNICAL FIELD

Embodiments of the present disclosure relate to the field of communications technologies, and in particular, to a buffer status reporting method, a relay terminal device, and a computer-readable storage medium.

BACKGROUND

Both long term evolution (Long Term Evolution, LTE) systems and new radio (New Radio, NR) systems can support sidelink (sidelink). Sidelink enables direct data transmission between terminal devices without intervention of a network device, for example, vehicle to everything (vehicle to everything, V2X) communication.

However, during data transmission using sidelink, a remote terminal device needs to buffer to-be-transmitted data in a relay terminal device. After the buffering of the to-be-transmitted data is completed, the relay terminal device reports data information of the buffered to-be-transmitted data to a network device, so that the network device allocates an uplink resource for the relay terminal device. This results in a relatively long latency for the relay terminal device to report a buffer status of the to-be-transmitted data, which leads to a relatively long data transmission delay, and further reduces the efficiency of data transmission.

SUMMARY

Embodiments of the present disclosure provide a buffer status reporting method, a relay terminal device, and a computer-readable storage medium to resolve a prior-art problem that a relatively long delay for a relay terminal device to report a buffer status of to-be-transmitted data leads to a relatively long data transmission delay and low transmission efficiency.

To resolve the foregoing technical problem, the present disclosure is implemented as follows:

According to a first aspect, an embodiment of the present disclosure provides a buffer status reporting method, applied to a relay terminal device and including:

determining data information of to-be-transmitted data, where the to-be-transmitted data is data which is about to be sent by a remote terminal device to a network device through the relay terminal device;

generating a target buffer status report based on the data information, where the target buffer status report is a to-be-sent buffer status report; and reporting the target buffer status report to the network device.

According to a second aspect, an embodiment of the present disclosure provides a relay terminal device, including:

an information determining module, configured to determine data information of to-be-transmitted data, where the to-be-transmitted data is data which is about to be sent by a remote terminal device to a network device through the relay terminal device;

a report generation module, configured to generate a target buffer status report based on the data information, where the target buffer status report is a to-be-sent buffer status report; and a reporting module, configured to report the target buffer status report to the network device.

According to a third aspect, an embodiment of the present disclosure provides a relay terminal device, including a processor, a memory, and a computer program stored in the memory and capable of running on the processor, where when the computer program is executed by the processor, the steps of the buffer status reporting method according to the first aspect are implemented.

According to a fourth aspect, an embodiment of the disclosure present disclosure provides a computer-readable storage medium, where the computer-readable storage medium stores a computer program, and when the computer program is executed by a processor, the steps of the buffer status reporting method according to the first aspect are implemented.

In the embodiments of the present disclosure, after determining data information of to-be-transmitted data that a remote terminal device is about to send to a network device through a relay terminal device, the relay terminal device can generate a to-be-sent buffer status report, based on the data information, and report the to-be-sent buffer status report to the network device, so as to request, before receiving the to-be-transmitted data, the network device to pre-allocate an uplink resource corresponding to the to-be-transmitted data to the relay terminal device based on the to-be-sent buffer status report, so that the relay terminal device can complete the reporting of the buffer status of the to-be-transmitted data before the remote terminal device buffers the to-be-transmitted data in the relay terminal device. This reduces a delay in reporting the buffer status of the to-be-transmitted data by the relay terminal device, thereby reducing a data transmission delay and improving data transmission efficiency.

BRIEF DESCRIPTION OF DRAWINGS

The present disclosure can be better understood from the following descriptions of specific embodiments of the present disclosure with reference to the accompanying drawings. In the drawings, the same or similar reference signs represent the same or similar features.

DESCRIPTION OF EMBODIMENTS

The following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
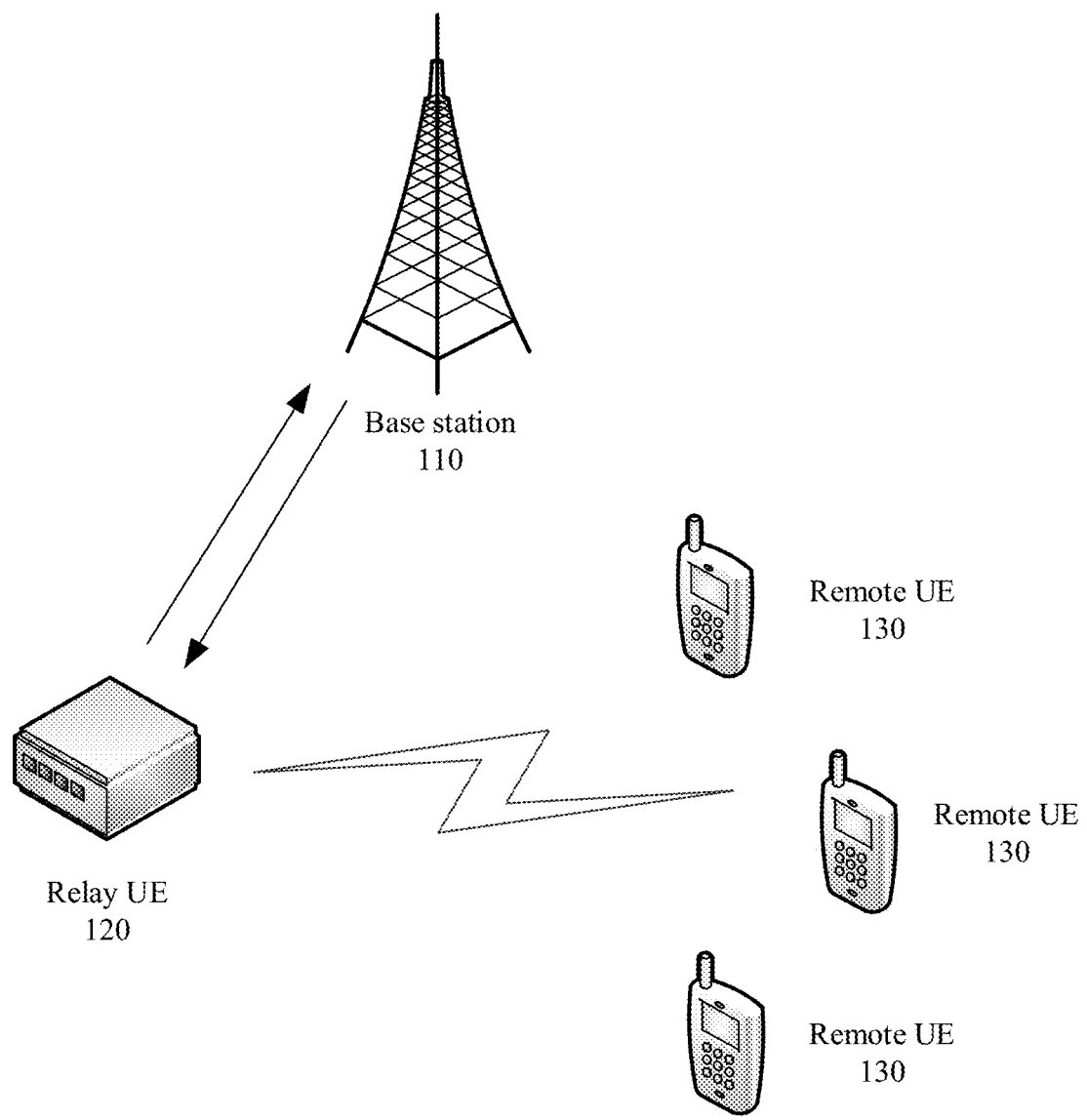
FIG. 1 is a system architecture diagram of a sidelink transmission system.

FIG. 1 is a system architecture diagram of a sidelink transmission system. As shown in FIG. 1, the sidelink transmission system may be applied to an LTE system or an NR system, and the sidelink transmission system may include a base station 110, relay user equipment (User Equipment, UE) 120, and at least one remote UE 130.

The remote UE 130 may be a device used by a user, including but not limited to, a mobile phone, a tablet computer, a laptop computer, a palmtop computer, an in-vehicle terminal, a wearable device, a pedometer, and the like. The relay UE 120 may be communicatively connected to each remote UE 130 through a sidelink interface, communicatively connected to the base station 110 through a user-uplink (User-uplink, Uu) interface, and is configured to forward to the base station 110 data transmitted from the remote UE 130 to the relay UE 120.

In the prior art, during data transmission by using a sidelink transmission system, a remote UE 130 needs to buffer to-be-transmitted data in a relay UE 120, and after the buffering of the to-be-transmitted data is completed, the relay UE 120 reports data information of the buffered to-be-transmitted data to a base station 110, so that the base station 110 allocates an uplink resource for the relay UE 120. This results in a relatively long delay in reporting a buffer status of the to-be-transmitted data by the relay UE 120, which leads to a relatively long data transmission delay, and reduces data transmission efficiency.

To resolve the foregoing problem in the prior art, the embodiments of the present disclosure provide a buffer status reporting method, a relay terminal device, and a computer-readable storage medium. The following first describes in detail the buffer status reporting method provided in the embodiments of the present disclosure.

Figure 2:
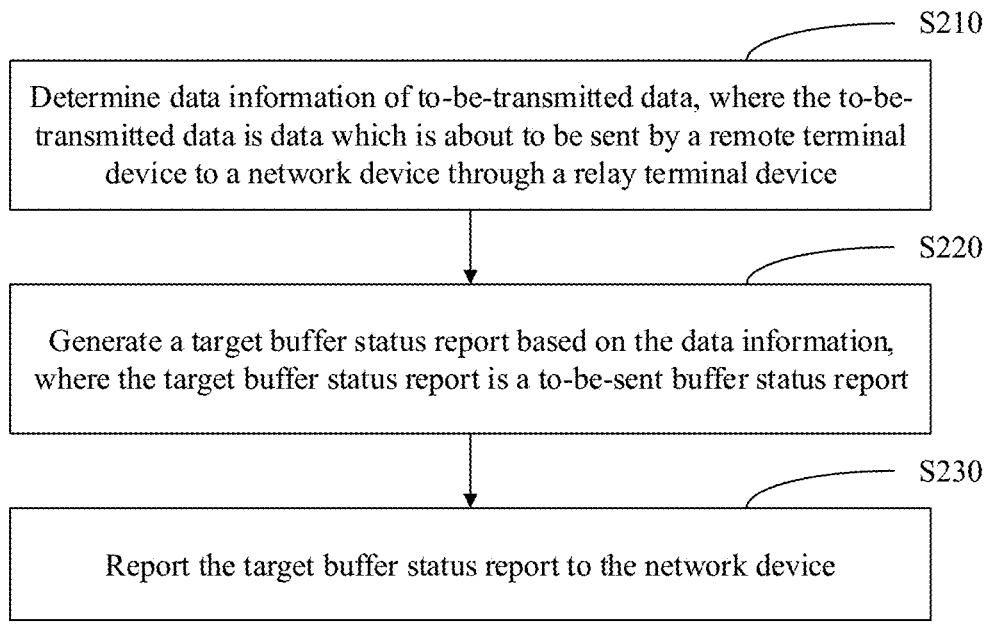
FIG. 2 is a schematic flowchart of an embodiment of a buffer status reporting method according to the present disclosure.

FIG. 2 is a schematic flowchart of an embodiment of a buffer status reporting method according to the present disclosure.

In some embodiments of the present disclosure, the method shown in FIG. 2 may be executed by a relay terminal device. The relay terminal device may be configured to forward to a network device data sent from a remote terminal device to the relay terminal device. For example, the relay terminal device may be the relay UE 120 shown in FIG. 1, the remote terminal device may be the remote UE 130 shown in FIG. 1, and the network device may be the base station 110 shown in FIG. 1. As shown in FIG. 2, the buffer status reporting method may include the following steps.

S210: Determine data information of to-be-transmitted data.

The to-be-transmitted data is data which is about to be sent by a remote terminal device to a network device through a relay terminal device.

S220: Generate a target buffer status report based on the data information.

The target buffer status report is a to-be-sent buffer status report.

S230: Report the target buffer status report to the network device.

In this embodiment of the present disclosure, after determining the data information of the to-be-transmitted data that the remote terminal device is about to send to the network device through the relay terminal device, the relay terminal device can generate a to-be-sent buffer status report based on the data information, and report the to-be-sent buffer status report to the network device, so as to request, before receiving the to-be-transmitted data, the network device to pre-allocate an uplink resource corresponding to the to-be-transmitted data to the relay terminal device based on the to-be-sent buffer status report, so that the relay terminal device can complete the reporting of the buffer status of the to-be-transmitted data before the remote terminal device buffers the to-be-transmitted data in the relay terminal device. This reduces a delay in reporting the buffer status of the to-be-transmitted data by the relay terminal device, thereby reducing a data transmission delay and improving data transmission efficiency.

Specifically, the relay terminal device pre-reports the to-be-sent buffer status report to the network device. In this way, after the remote terminal device buffers the to-be-transmitted data in the relay terminal device and the buffering of the to-be-transmitted data is completed, an uplink grant allocated by the network device to the relay terminal device based on the pre-reported data information has arrived, and the relay terminal device may directly transmit the to-be-transmitted data to the network device. This can reduce a delay in reporting the buffer status of the to-be-transmitted data by the relay terminal device and increase timeliness of uplink scheduling, thereby improving system performance and user experience of the sidelink transmission system.

In S210 of this embodiment of the present disclosure, after the relay terminal device learns transmission resource information that is about to be sent from the remote terminal device to the network device through the relay terminal device, the relay terminal device can predict, based on the transmission resource information, the data information of the to-be-transmitted data that it will receive.

In these embodiments, optionally, the specific method of S210 may include any one of the following cases:

I. The remote terminal device is in a UE autonomous resource selection mode.

When the remote terminal device is in a UE autonomous resource selection mode, the relay terminal device determines the data information based on sidelink control information (Sidelink Control Information, SCI) sent by the remote terminal device.

When the remote terminal device is in the UE autonomous resource selection mode, the remote terminal device may autonomously select a resource, or may obtain a sidelink resource from a resource pool in a sensing (sensing) and reserved (reserved) manner.

In this case, after obtaining the sidelink resource, the remote terminal device sends the SCI on a sidelink interface. The SCI may include a reserved resource size corresponding to the to-be-transmitted data, a transmission mode corresponding to the to-be-transmitted data, service information (for example, a service priority) corresponding to the to-be-transmitted data, a reserved resource location corresponding to the to-be-transmitted data, and the like. The relay terminal device can receive the SCI, and determine, based on the SCI, the data information of the to-be-transmitted data that is about to be transmitted by the remote terminal device, to trigger the reporting of the target buffer status report.

II. The relay terminal device has a sidelink resource scheduling function.

When the relay terminal device has a sidelink resource scheduling function, the relay terminal device determines the data information based on a sidelink buffer status report (Buffer Status Report, BSR) reported by the remote terminal device.

In some cases, from the perspective of resource scheduling or unified management, the relay terminal device may have a sidelink resource scheduling function.

In this case, the remote terminal device needs to report its sidelink BSR to the relay terminal device, so that the relay terminal device performs resource scheduling for the remote terminal device based on the sidelink BSR. Therefore, when receiving the sidelink BSR reported by the remote terminal device, the relay terminal device has already determined the data information of the to-be-transmitted data that the relay terminal device needs to forward to the network device. In this case, the reporting of the target buffer status report can be triggered through a Uu interface.

III. The relay terminal device has a sidelink resource scheduling function and the relay terminal device has sent a resource grant to the remote terminal device.

When the relay terminal device has a sidelink resource scheduling function and the relay terminal device has sent a resource grant to the remote terminal device, the relay terminal device determines the data information based on transmission information of data corresponding to the resource grant.

In some cases, when receiving the sidelink BSR reported by the remote terminal device, the relay terminal device cannot perform scheduling for the remote terminal device at one time, but can only perform scheduling for transmission of a part of data for the remote terminal device depending on a resource situation, and provides a resource grant for this part of data. In this case, it is highly probable that this part of data for which the relay terminal device has sent a resource grant to the remote terminal device are to be forwarded through the Uu interface next time. Therefore, it is possible to report only data information of this part of data. Therefore, the relay terminal device may determine the data information of to-be-transmitted data based on the transmission information of the data corresponding to the resource grant, to trigger the reporting of the target buffer status report.

IV. The remote terminal device is in a scheduled-by-base-station mode.

When the remote terminal device is in a scheduled-by-base-station mode, the relay terminal device determines the data information based on detected scheduling information which is provided by a base station for the remote terminal device.

When the remote terminal device is in a scheduled-by-base-station mode, the network device needs to allocate a resource to the remote terminal device.

In this case, if the relay terminal device can monitor base station provided scheduling information sent by the network device to the remote terminal device, the relay terminal device may determine the data information of to-be-transmitted data based on the detected base station provided scheduling information, to trigger the reporting of the target buffer status report.

In some embodiments of the present disclosure, the data information may include a data size of the to-be-transmitted data and service information corresponding to the to-be-transmitted data. The service information may include logical channel group (Logical Channel Group, LCG) information of the to-be-transmitted data on a sidelink interface or a service priority corresponding to the to-be-transmitted data.

In these embodiments, the service information may vary with different ways of determining the data information by the relay terminal device. Specifically, when the remote terminal device is in the UE autonomous resource selection mode, the service information may be the service priority of the to-be-transmitted data on the sidelink interface. In the case that the relay terminal device has the sidelink resource scheduling function, and in the case that the relay terminal device has a sidelink resource scheduling function and the relay terminal device has sent a resource grant to the remote terminal device, the service information may include the LCG information of the to-be-transmitted data on the sidelink interface.

In these embodiments, optionally, the specific method of S220 may include:

determining, according to a preset mapping relationship, a target LCG corresponding to the service information, where the target LCG is an LCG on an uplink interface of the relay terminal device;

determining, based on the data size, a target buffer size corresponding to the target LCG; and generating the target buffer status report based on the target LCG and the target buffer size.

In these embodiments, the target LCG corresponding to the service information may be first determined according to the preset mapping relationship, then the target buffer size corresponding to the target LCG may be determined based on the data size, and finally the target buffer status report for indicating the target LCG corresponding to the to-be-transmitted data and the data size of the to-be-transmitted data may be generated based on the target LCG and the target buffer size.

In some embodiments, the uplink interface of the relay terminal device may be a Uu interface.

Specifically, LCGs on the sidelink interface and the LCGs on the Uu interface have a preset mapping relationship, and service priorities of the LCGs on the sidelink interface and service priorities of the LCGs on the Uu interface also have a preset mapping relationship. Therefore, after either service information of the LCG information of the to-be-transmitted data on the sidelink interface and the service priority corresponding to the to-be-transmitted data is determined, the target LCG on the Uu interface may be matched for the to-be-transmitted data according to the preset mapping relationship between the service information and the LCG on the Uu interface.

In some embodiments of the present disclosure, the preset mapping relationship may be determined according to a network configuration or a preset rule, which is not limited herein.

In the case that the preset mapping relationship is determined according to the network configuration, the preset mapping relationship may be determined directly based on a correspondence between the service priorities configured by a network and the LCGs on the Uu interface; or the preset mapping relationship may be determined based on a correspondence between the LCGs on the sidelink interface configured by a network and the LCGs on the Uu interface.

In the case that the preset mapping relationship is determined according to the preset rule, the preset rule may include a same-priority rule. Specifically, the same-priority rule means that: a priority of the LCG corresponding to the to-be-transmitted data on the Uu interface is the same as the service priority, or a priority of the LCG on the Uu interface corresponding to the LCG on the sidelink interface is the same as the priority of the LCG on the sidelink interface.

For example, the sidelink interface supports 8 service priorities, and there are 8 LCGs on the sidelink interface and 8 LCGs on the Uu interface. When the service priorities are 1-8, a smaller number indicates a higher service priority. When the LCGs on the sidelink interface are numbered 0-7, a smaller number corresponds to a higher priority, and the priorities are also 1-8. When the LCGs on the Uu interface are numbered 0-7, a smaller number corresponds to a higher priority, and the priorities are also 1-8. When the service priorities are transmitted on the sidelink interface, the preset mapping relationship determined according to the same-priority rule is that: the service priorities 1-8 are sequentially mapped to the LCGs 0-7 on the Uu interface in descending order. When the LCG information is transmitted on the sidelink interface, the preset mapping relationship determined according to the same-priority rule is that: the LCGs 0-7 of the sidelink interface are sequentially mapped to the LCGs 0-7 on the Uu interface in descending order.

In this embodiment of the present disclosure, the to-be-sent buffer status report is a buffer status report pre-reported to the network device before the relay terminal device receives the to-be-transmitted data.

In some embodiments of the present disclosure, the target buffer status report may include a medium access control subheader MAC subheader, where the MAC subheader includes a logical channel (Logical Channel, LC) identity (Identity, ID) field, and the LCID field has an LCID value.

In some other embodiments of the present disclosure, in addition to the MAC subheader, the target buffer status report may also include a length indication field, where the length indication field is used to indicate the total report length.

In some embodiments, the LCID value of the LCID field may include any of the following cases.

I. The LCID field includes only one LCID value associated with the target buffer status report.

In this case, the LCID field may include a first LCID value, and the first LCID value is used to indicate that the target buffer status report is a to-be-sent type of report.

Specifically, the first LCID value is used to only inform the network device that the information is a to-be-sent buffer status report, and that the to-be-sent buffer status report is in a first report format.

It should be noted that, in this case, the first LCID value does not specify whether the report is in the first report format or in a truncated first report format.

II. The LCID field includes two LCID values associated with the target buffer status report.

In this case, the LCID field may include a second LCID value or a third LCID value, the second LCID value is used to indicate that the target buffer status report is in a first report format, and the third LCID value is used to indicate that the target buffer status report is in a truncated first report format.

The first report format and the truncated first report format are the same report formats, except that the truncated first report format only contains a part of the to-be-sent buffer status information, and there is still unreported to-be-sent buffer status information.

III. The LCID field includes three LCID values associated with the target buffer status report.

In this case, the LCID field includes a fourth LCID value, a fifth LCID value, or a sixth LCID value. The fourth LCID value is used to indicate that the target buffer status report is in the first report format, the fifth LCID value is used to indicate that the target buffer status report is in the truncated first report format, and the sixth LCID value is used to indicate that the target buffer status report is in a second report format.

The first report format and the second report format are different report formats. A total report length corresponding to the first report format is greater than or equal to a total report length corresponding to the second report format, meaning that the first report format is a long report format and the second report format is a short report format.

IV. The LCID field includes four LCID values associated with the target buffer status report.

In this case, the LCID field includes a seventh LCID value, an eighth LCID value, a ninth LCID value, or a tenth LCID value. The seventh LCID value is used to indicate that the target buffer status report is in the first report format, the eighth LCID value is used to indicate that the target buffer status report is in the truncated first report format, the ninth LCID value is used to indicate that the target buffer status report is in the second report format, and the tenth LCID value is used to indicate that the target buffer status report is in a truncated second report format.

The second report format and the truncated second report format are the same report formats, except that the truncated second report format only contains a part of the to-be-sent buffer status information, and there is still unreported to-be-sent buffer status information.

In some embodiments of the present disclosure, the first report format may include at least one of the following:

an LCG indication signal and an LCG buffer status, where the LCG indication signal is used to indicate whether each LCG has to-be-transmitted data, and the LCG buffer status is used to indicate a buffer size corresponding to the LCG having to-be-transmitted data; and at least two sets of report information, where each set of the report information includes an LCG identity and an LCG buffer status, the LCG identity is used to indicate an LCG having to-be-transmitted data, and the LCG buffer status is used to indicate a buffer size corresponding to the LCG.

Figure 3:
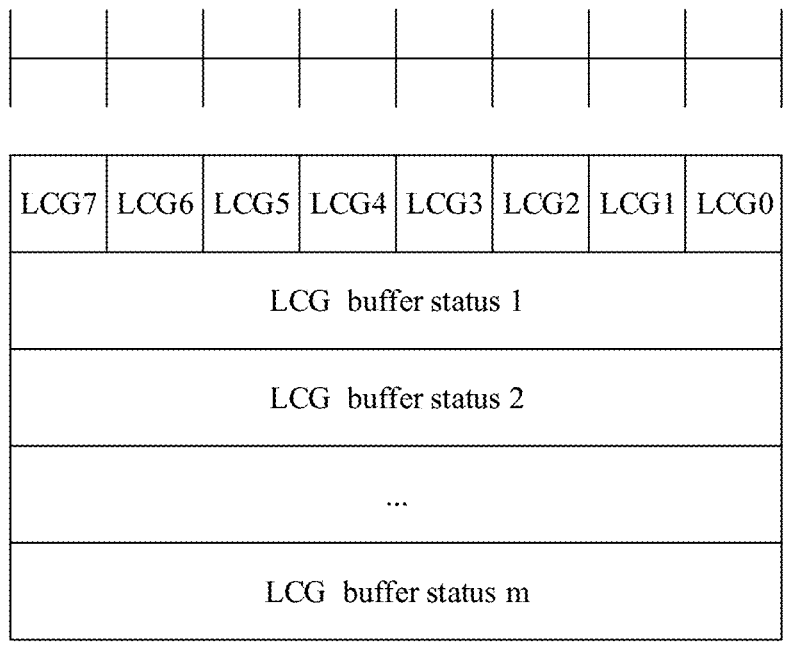
FIG. 3 is a schematic structural diagram of an example of a report format according to an embodiment of the present disclosure.

FIG. 3 is a schematic structural diagram of an example of a report format according to an embodiment of the present disclosure. The report format shown in FIG. 3 is a first report format, and the first report format includes an LCG indication signal and an LCG buffer status.

The LCG indication signal consists of 8 bits, representing 8 LCGs respectively. If a bit corresponding to an LCG is set to 1, it indicates that the LCG has to-be-transmitted data, that is, the LCG has a to-be-sent buffer status report. If a bit corresponding to an LCG is set to 0, it indicates that the LCG has no to-be-transmitted data, that is, the LCG has no to-be-sent buffer status report.

The first report format sequentially carries a buffer size of each LCG whose bit is 1, that is, an LCG buffer status. Each LCG buffer status consists of 8 bits.

Thus, integrity of the generated target buffer status report can be improved.

Sill referring to FIG. 3, the truncated first report format is used mainly because a resource space is insufficient to accommodate a complete target buffer status report. The target buffer status report is truncated, so as to fully utilize a small resource to report important buffer status information to the network device as soon as possible. To be specific, the truncated first report format does not include all buffer status information, a buffer size of an LCG with a highest priority is reported, while a buffer size of remaining LCGs that cannot be accommodated can be discarded. However, bits corresponding to such LCGs that cannot be accommodated are remained as 1 to inform the network device that such LCGs also have data, but the data is not carried due to insufficient resources.

It should be noted that, if there are LCGs with the same priority, buffer statuses of these LCGs are all reserved or discarded. If there is only one resource location, but two optional LCGs with the same priority, one may be randomly selected, thereby avoiding resource waste.

Figure 4:
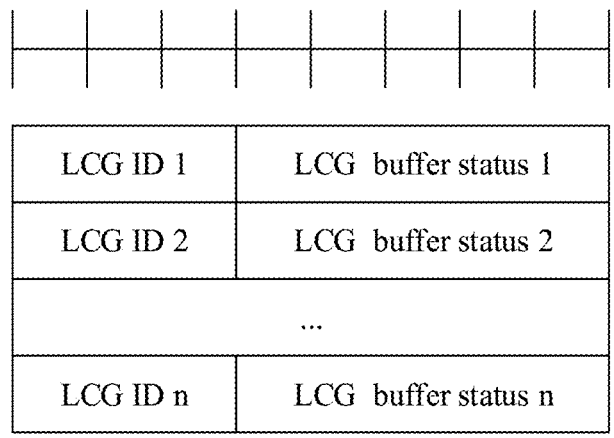
FIG. 4 is a schematic structural diagram of another example of a report format according to an embodiment of the present disclosure.

FIG. 4 is a schematic structural diagram of another example of a report format according to an embodiment of the present disclosure. The report format shown in FIG. 4 is a first report format. The first report format includes at least two sets of report information, and each set of the report information includes an LCG identity and an LCG buffer status.

The LCG identity may include 3 bits, and the LCG identity indicates that an LCG has to-be-transmitted data, or is an ID value corresponding to an LCG having a to-be-sent buffer status report. The LCG buffer status may include 5 bits, and is used to indicate a buffer size corresponding to the LCG.

The number of data groups in the to-be-sent buffer status report in such report format varies with the actual number of LCGs with a to-be-sent buffer status report.

In this way, the generated target buffer status report is more flexible.

In some embodiments of the present disclosure, the first report format and the truncated first report format may alternatively be represented by using the same LCD value, and identified based on the number of bits and the number of buffer statuses. For example, if the number of bits that are 1 is the same as the number of buffer statuses, it indicates the first report format; if the number of bits that are 1 is different from the number of buffer statuses, it indicates the truncated first report format.

In some embodiments of the present disclosure, the second report format may include:
one set of report information, where the set of the report information includes an LCG identity and an LCG buffer status, the LCG identity is used to indicate an LCG having to-be-transmitted data, and the LCG buffer status is used to indicate a buffer size corresponding to the LCG.

It should be noted that the second report format can only have one set of report information, while the first report format can have two or more sets of report information. Because the first report format may have at least two sets of report information, a total report length of the first report format is not fixed, and a length indication field is required to indicate its total report length. Because the second report format has only one set of report information, a total report length of the second report format is fixed, and no length indication field is required to indicate its total report length.

Figure 5:
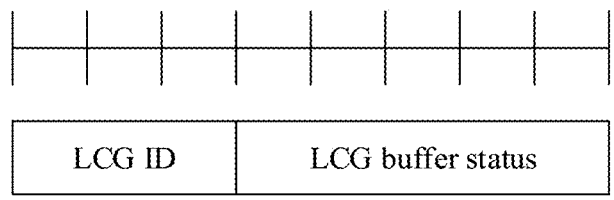
FIG. 5 is a schematic structural diagram of still another example of a report format according to an embodiment of the present disclosure.

FIG. 5 is a schematic structural diagram of still another example of a report format according to an embodiment of the present disclosure. The report format shown in FIG. 5 is a second report format. The second report format includes one set of report information, and the set of the report information includes an LCG identity and an LCG buffer status.

Specifically, the LCG identity may include 3 bits, and the LCG identity indicates that an LCG has to-be-transmitted data, or is an ID value corresponding to an LCG having a to-be-sent buffer status report. The LCG buffer status may include 5 bits, and is used to indicate a buffer size corresponding to the LCG.

In this way, resources occupied by the generated target buffer status report can be reduced.

Sill referring to FIG. 5, the truncated second report format is used mainly because a resource space is insufficient to accommodate a complete target buffer status report. The target buffer status report is truncated, so as to fully utilize a small resource to report important buffer status information to the network device as soon as possible. The truncation method of the second report format is similar to the truncation method of the first report format, and is not repeated herein.

It should be noted that the second report format and the truncated second report format are distinguished to further refine the report information, so that the network device can determine whether only one LCG has a buffer status or a buffer status of only one LCG can be reported due to limited resources. The second report format and the truncated second report format may also be represented by using the same LCID value. When there is a surplus in resource, that is, other data with a lower transmission priority than the target buffer status report is also carried on the resource, the network device may determine that only one LCG has a buffer status, and that the target buffer status report is in the second report format. If in an entire MAC protocol data unit (Protocol Data Unit, PDU), the target buffer status report is data with a lowest transmission priority, the target buffer status report may be in the truncated second report format.

In some embodiments of the present disclosure, the specific method of S230 may include:
in a case that there is an available uplink resource corresponding to the target buffer status report, sending the target buffer status report to the network device by using the available uplink resource.

Optionally, the available uplink resource may be a new uplink transmission resource and/or an uplink resource for use by a logical channel that is not restrained from triggering the target buffer status report.

In some embodiments, the available uplink resource may be a new uplink transmission resource for use by a logical channel that is not restrained from triggering the target buffer status report.

Specifically, in the case that there is the available uplink resource, the relay terminal device may directly send the target buffer status report to the network device on the available uplink resource.

In some other embodiments of the present disclosure, the specific method of S230 may further include:
in a case that there is no available uplink resource corresponding to the target buffer status report, sending an uplink scheduling request (Scheduling Request, SR) to the network device; and
sending the target buffer status report to the network device on an allocated uplink resource, where the allocated uplink resource is an available uplink resource allocated by the network device to the relay terminal device based on the SR.

Optionally, the available uplink resource may be a new uplink transmission resource and/or an uplink resource for use by a logical channel that is not restrained from triggering the target buffer status report.

In some embodiments, the available uplink resource may be a new uplink transmission resource for use by a logical channel that is not restrained from triggering the target buffer status report.

Specifically, in the case that there is no such available uplink resource, the relay terminal device needs to send an SR to the network device first, so that the network device allocates an available uplink resource to the relay terminal device based on the SR; and the relay terminal device sends the target buffer status report to the network device on the available uplink resource allocated by the network device.

In some embodiments of the present disclosure, when none of logical channels in one LCG of the relay terminal device has buffered data, if the LCG has a target buffer status report that needs to be reported, no regular BSR is triggered. The regular BSR is used to indicate that none of the logical channels in the LCG has buffered data.

In the embodiments of the present disclosure, the relay terminal device needs to reuse and group various types of data at the MAC layer. Therefore, the various types of data need to be sorted by priority. In the case of insufficient resources, data with a higher priority will be transmitted first.

In some embodiments of the present disclosure, the specific method of S230 may further include:
  determining a transmission priority of the target buffer status report according to a preset transmission priority rule; and
  reporting the target buffer status report to the network device based on the transmission priority.

In some embodiments, a transmission priority of a normally reported target buffer status report is higher than the transmission priority of the target buffer status report used as padding information.

In some embodiments, the target buffer status report is represented as a pre-BSR, and transmission priorities sorted in descending order according to the preset transmission priorities are as follows:
  a MAC control element CE for transmitting a cell radio network temporary identity (C-RNTI), or data from an uplink common control channel (UL-CCCH);
  a MAC CE for transmitting a configured grant confirmation;
  a MAC CE for transmitting any buffer status report BSR except a BSR for padding;
  option 1: a MAC CE for transmitting any to-be-sent buffer status report for sidelink relay except a to-be-sent buffer status report for padding;
  MAC CE for transmitting a single power headroom report (PHR) or MAC CE for transmitting multiple PHRs;
  option 2: a MAC CE for transmitting any to-be-sent buffer status report for sidelink relay except a to-be-sent buffer status report for padding;
  MAC CE for transmitting any sidelink BSR except a sidelink BSR for padding;
  option 3: a MAC CE for transmitting any to-be-sent buffer status report for sidelink relay except a to-be-sent buffer status report for padding;
  data from any logical channel except UL-CCCHs;
  a MAC CE for transmitting a recommended bit rate query;
  a MAC CE for transmitting a BSR for padding;
  Alt 1: a MAC CE for transmitting a to-be-sent buffer status report for padding;
  a MAC CE for transmitting a sidelink BSR for padding;
  Alt 2: a MAC CE for transmitting a to-be-sent buffer status report for padding.

Options 1 to 3 represent possible locations of the transmission priorities of the to-be-sent buffer status reports other than the to-be-sent buffer status reports for padding, that is, possible locations of the transmission priorities of normally reported target buffer status reports. Alts 1 and 2 represent possible locations of the transmission priorities of the to-be-sent buffer status reports for padding, that is, possible locations of the transmission priorities of the target buffer status reports as padding information.

Therefore, according to the preset transmission priority rule, the transmission priority of the target buffer status report in multiple pieces of to-be-transmitted data may be determined, and based on the determined transmission priority, the target buffer status report is reported to the network device according to the priority order.

In some embodiments of the present disclosure, before S210, the buffer status reporting method may further include:
  receiving report configuration information sent by the network device, where the report configuration information may include an on-off configuration of the target buffer status report.

In these embodiments, optionally, the specific method of S220 may include:
  generating the target buffer status report based on the data information in the case that the on-off configuration is on.

In these embodiments, even if the relay terminal device is capable of uploading the target buffer status report, the relay terminal device still needs to receive the on-off configuration of the target buffer status report sent by the network device. In the case that the on-off configuration is on, the relay terminal device generates the target buffer status report based on the data information; in the case that the on-off configuration is off, the relay terminal device does not generate the target buffer status report based on data information.

In some embodiments of the present disclosure, the report configuration information may further include a generation configuration of the target buffer status report.

In these embodiments, optionally, the specific method of S220 may include:
  generating the target buffer status report based on the data information and the generation configuration.

In these embodiments, optionally, the generation configuration of the target buffer status report may include at least one of the following:
  a report format of the target buffer status report; and
  an LCG with a function of triggering a target buffer status report.

In these embodiments, the relay terminal device may generate the corresponding target buffer status report based on the generation configuration configured by the network device for the relay terminal device.

In some embodiments of the present disclosure, the report configuration information may further include a reporting configuration of the target buffer status report.

In these embodiments, optionally, the specific method of S230 may include:
  reporting the target buffer status report to the network device based on the reporting configuration.

In these embodiments, optionally, the reporting configuration of the target buffer status report may include at least one of the following:
whether the target buffer status report is reported as padding information;
whether the target buffer status report has a function of triggering an SR;
an LCG to which the target buffer status report having a function of triggering an SR corresponds;
an LCG to which the target buffer status report having a function of triggering an SR with a delay timer corresponds;
a parameter of a delay timer for the target buffer status report;
a parameter of a retransmission timer for the target buffer status report; and
a parameter of a disable timer for the target buffer status report.

In these embodiments, the relay terminal device may report the target buffer status report to the network device based on the reporting configuration configured by the network device for the relay terminal device.

In some embodiments of the present disclosure, before receiving a report configuration information sent by the network device, the buffer status reporting method may further include:
reporting a report capability parameter to the network device, where the report capability parameter is used by the network device to configure the report configuration information for the relay terminal device.

In these embodiments, the relay terminal device needs to first report the report capability parameter to the network device, for example, whether reporting of the target buffer status report is supported, which generation method is supported, or which reporting method is supported, so that the network device configures the report configuration information for the relay terminal device based on the report capability parameter reported by the relay terminal device.

To sum up, the buffer status reporting method provided in the embodiments of the present disclosure enables the relay terminal device to pre-report a buffer status of data information to-be-transmitted information to the network device after learning the data information of the to-be-transmitted data that the remote terminal device is about to transmit to the network device through the relay terminal device, thereby reducing a delay in reporting the buffer status of the to-be-transmitted data by the relay terminal device, increasing the timeliness of uplink scheduling, and improving system performance and user experience of a sidelink transmission system.

Figure 6:
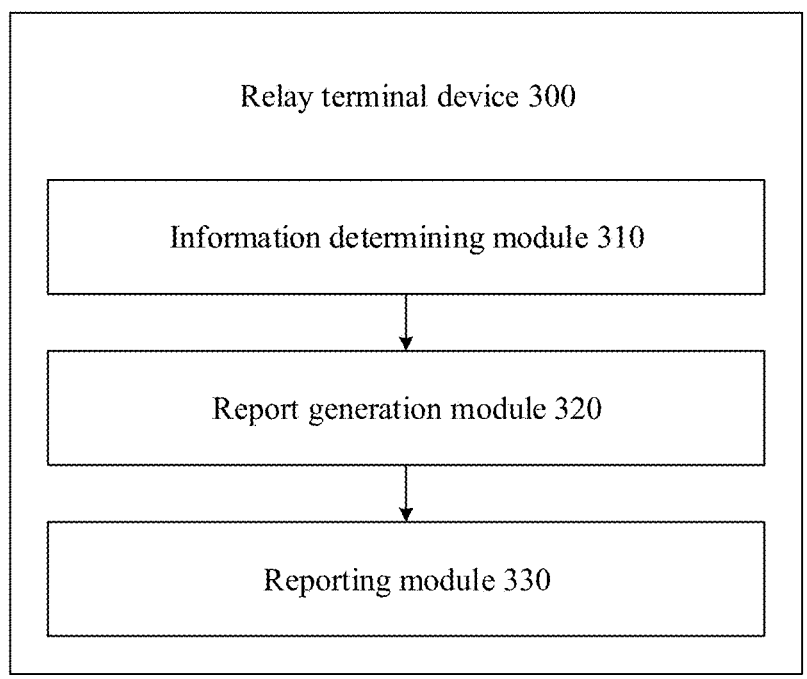
FIG. 6 is a schematic structural diagram of an embodiment of a relay terminal device according to the present disclosure.

FIG. 6 is a schematic structural diagram of an embodiment of a relay terminal device according to the present disclosure.

In some embodiments of the present disclosure, the relay terminal device shown in FIG. 6 may be configured to forward to a network device data sent from a remote terminal device to the relay terminal device. For example, the relay terminal device may be the relay UE 120 shown in FIG. 1, the remote terminal device may be the remote UE 130 shown in FIG. 1, and the network device may be the base station 110 shown in FIG. 1. As shown in FIG. 6, the relay terminal device 300 may include:
an information determining module 310, configured to determine data information of to-be-transmitted data, where
the to-be-transmitted data is data which is about to be sent by a remote terminal device to a network device through the relay terminal device 300.
a report generation module 320, configured to generate a target buffer status report based on the data information, where
the target buffer status report is a to-be-sent buffer status report.
a reporting module 330, configured to report the target buffer status report to the network device.

In this embodiment of the present disclosure, after determining the data information of the to-be-transmitted data that the remote terminal device is about to send to the network device through the relay terminal device 300, the relay terminal device 300 can generate a to-be-sent buffer status report based on the data information, and report the to-be-sent buffer status report to the network device, so as to request, before receiving the to-be-transmitted data, the network device to pre-allocate an uplink resource corresponding to the to-be-transmitted data to the relay terminal device 300 based on the to-be-sent buffer status report, so that the relay terminal device 300 can complete the reporting of the buffer status of the to-be-transmitted data before the remote terminal device buffers the to-be-transmitted data in the relay terminal device 300. This reduces a delay in reporting the buffer status of the to-be-transmitted data by the relay terminal device 300, thereby reducing a data transmission delay and improving data transmission efficiency.

In some embodiments of the present disclosure, the information determining module 310 may be specifically configured to:
when the remote terminal device is in a UE autonomous resource selection mode, determine the data information based on sidelink control information SCI sent by the remote terminal device; or
when the relay terminal device 300 has a sidelink resource scheduling function, determine the data information based on a sidelink buffer status report sidelink BSR reported by the remote terminal device; or
when the relay terminal device 300 has a sidelink resource scheduling function and the relay terminal device 300 has sent a resource grant to the remote terminal device, determine the data information based on transmission information of data corresponding to the resource grant; or
when the remote terminal device is in a scheduled-by-base-station mode, determine the data information based on detected scheduling information which is provided by a base station for the remote terminal device.

In some embodiments of the present disclosure, the reporting module 330 may be specifically configured to:
in a case that there is an available uplink resource corresponding to the target buffer status report, send the target buffer status report to the network device by using the available uplink resource.

In some other embodiments of the present disclosure, the reporting module 330 may be further specifically configured to:
in a case that there is no available uplink resource corresponding to the target buffer status report, send an uplink scheduling request SR to the network device; and
send the target buffer status report to the network device on an allocated uplink resource, where the allocated uplink resource is an available uplink resource allocated by the network device to the relay terminal device 300 based on the SR.

In some embodiments of the present disclosure, the available uplink resource includes at least one of the following:
a new uplink transmission resource; and
an uplink resource for use by a logical channel that is not restrained from triggering the target buffer status report.

In some embodiments of the present disclosure, the data information includes a data size of the to-be-transmitted data and service information corresponding to the to-be-transmitted data. The service information includes logical channel group LCG information of the to-be-transmitted data on a sidelink interface or a service priority corresponding to the to-be-transmitted data.

In some embodiments of the present disclosure, the report generation module 320 may be specifically configured to:
determine, according to a preset mapping relationship, a target LCG corresponding to the service information, where the target LCG is an LCG on an uplink interface of the relay terminal device;
determine, based on the data size, a target buffer size corresponding to the target LCG; and
generate the target buffer status report based on the target LCG and the target buffer size.

In some embodiments of the present disclosure, the preset mapping relationship is determined according to a network configuration or a preset rule.

In some embodiments of the present disclosure, the preset rule includes a same-priority rule.

In some embodiments of the present disclosure, the target buffer status report includes a media access control subheader MAC subheader, and the MAC subheader includes a logical channel identity LCID field, where
the LCID field includes a first LCID value, and the first LCID value is used to indicate that the target buffer status report is a to-be-sent type of report; or
the LCID field includes a second LCID value or a third LCID value, the second LCID value is used to indicate that the target buffer status report is in a first report format, and the third LCID value is used to indicate that the target buffer status report is in a truncated first report format; or
the LCID field includes a fourth LCID value, a fifth LCID value, or a sixth LCID value, the fourth LCID value is used to indicate that the target buffer status report is in the first report format, the fifth LCID value is used to indicate that the target buffer status report is in the truncated first report format, and the sixth LCID value is used to indicate that the target buffer status report is in a second report format; or
the LCID field includes a seventh LCID value, an eighth LCID value, a ninth LCID value, or a tenth LCID value, the seventh LCID value is used to indicate that the target buffer status report is in the first report format, the eighth LCID value is used to indicate that the target buffer status report is in the truncated first report format, the ninth LCID value is used to indicate that the target buffer status report is in the second report format, and the tenth LCID value is used to indicate that the target buffer status report is in a truncated second report format; where
a total report length corresponding to the first report format is greater than or equal to a total report length corresponding to the second report format.

In some embodiments of the present disclosure, the first report format includes at least one of the following:

an LCG indication signal and an LCG buffer status, where the LCG indication signal is used to indicate whether each LCG has to-be-transmitted data, and the LCG buffer status is used to indicate a buffer size corresponding to the LCG having to-be-transmitted data; and
at least two sets of report information, where each set of the report information includes an LCG identity and an LCG buffer status, the LCG identity is used to indicate an LCG having to-be-transmitted data, and the LCG buffer status is used to indicate a buffer size corresponding to the LCG.

In some embodiments of the present disclosure, the second report format includes:
one set of report information, where the set of the report information includes an LCG identity and an LCG buffer status, the LCG identity is used to indicate an LCG having to-be-transmitted data, and the LCG buffer status is used to indicate a buffer size corresponding to the LCG.

In some embodiments of the present disclosure, the target buffer status report further includes a length indication field, where the length indication field is used to indicate the total report length.

In some embodiments of the present disclosure, the reporting module 330 may be further specifically configured to:
determine a transmission priority of the target buffer status report according to a preset transmission priority rule; and
report the target buffer status report to the network device based on the transmission priority.

In some embodiments of the present disclosure, the relay terminal device 300 may further include:
a configuration receiving module, configured to, before the data information of the to-be-transmitted data is determined, receive report configuration information sent by the network device, where the report configuration information may include an on-off configuration of the target buffer status report.

In these embodiments, optionally, the report generation module 320 may be specifically configured to:
generate the target buffer status report based on the data information in the case that the on-off configuration is on.

In some embodiments of the present disclosure, the report configuration information may further include a generation configuration of the target buffer status report.

In these embodiments, optionally, the report generation module 320 may be specifically configured to:
generate the target buffer status report based on the data information and the generation configuration.

In some embodiments of the present disclosure, the generation configuration of the target buffer status report may include at least one of the following:
a report format of the target buffer status report; and
an LCG with a function of triggering a target buffer status report.

In some embodiments of the present disclosure, the report configuration information may further include a reporting configuration of the target buffer status report.

In these embodiments, optionally, the reporting module 330 may be specifically configured to:
report the target buffer status report to the network device based on the reporting configuration.

In some embodiments of the present disclosure, the reporting configuration of the target buffer status report may include at least one of the following:

- whether the target buffer status report is reported as padding information;
- whether the target buffer status report has a function of triggering an SR;
- an LCG to which the target buffer status report having a function of triggering an SR corresponds;
- an LCG to which the target buffer status report having a function of triggering an SR with a delay timer corresponds;
- a parameter of a delay timer for the target buffer status report;
- a parameter of a retransmission timer for the target buffer status report; and
- a parameter of a disable timer for the target buffer status report.

In some embodiments of the present disclosure, the relay terminal device 300 may further include:

- a parameter reporting module, configured to, before the report configuration information sent by the network device is received, report a report capability parameter to the network device, where the report capability parameter is used by the network device to configure the report configuration information for the relay terminal device 300.

It should be noted that the relay terminal device 300 provided in this embodiment of the present disclosure is capable of implementing various processes and effects implemented by the relay terminal device 300 in the method embodiments of FIG. 2 to FIG. 5. To avoid repetition, details are not described herein again.

Figure 7:
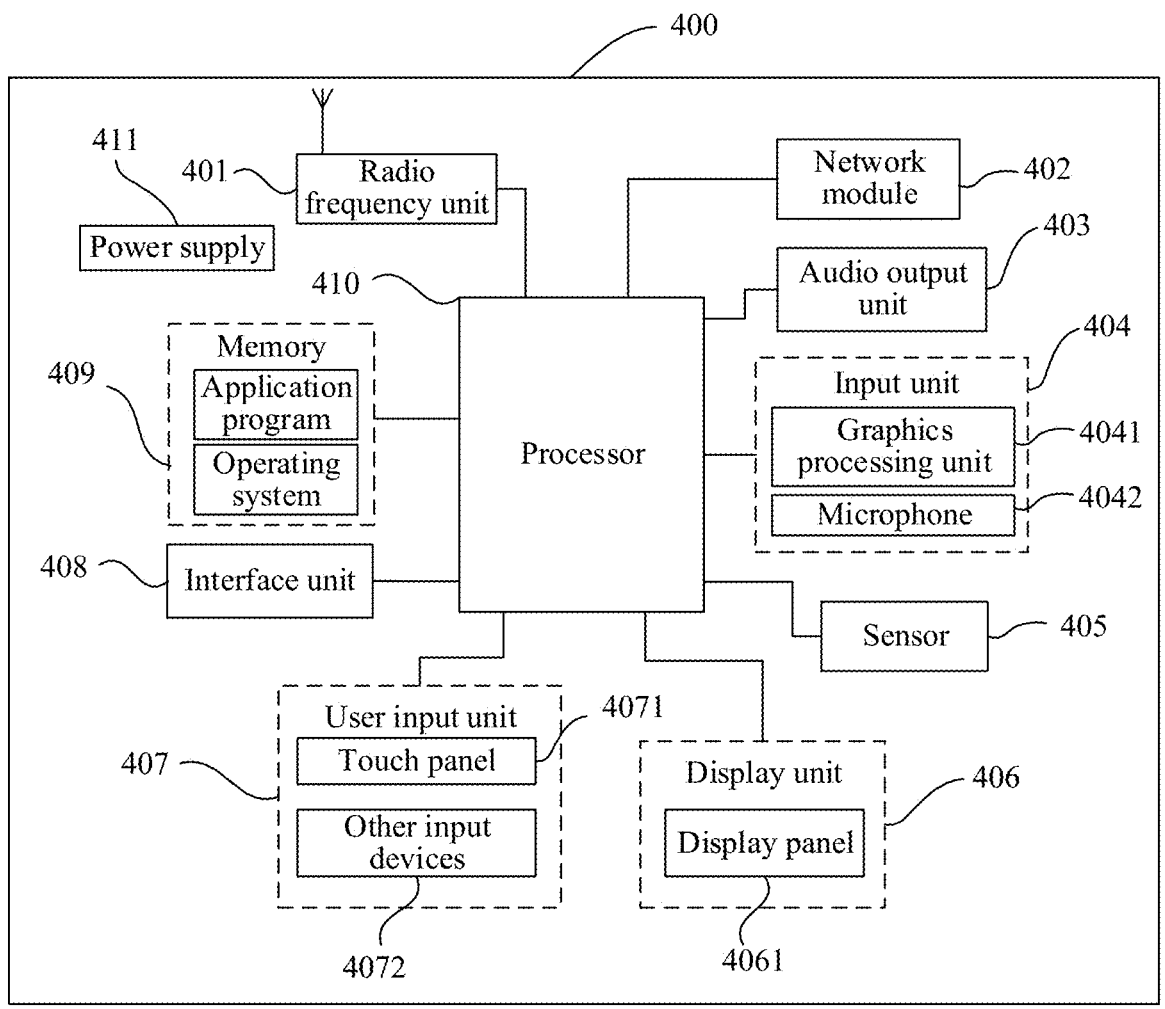
FIG. 7 is a schematic diagram of a hardware structure of an embodiment of a relay terminal device according to the present disclosure.

FIG. 7 is a schematic diagram of a hardware structure of an embodiment of a relay terminal device according to the present disclosure. As shown in FIG. 7, the relay terminal device 400 includes but is not limited to components, for example, a radio frequency unit 401, a network module 402, an audio output unit 403, an input unit 404, a sensor 405, a display unit 406, a user input unit 407, an interface unit 408, a memory 409, a processor 410, and a power supply 411. A person skilled in the art may understand that the relay terminal device is not limited to the relay terminal device structure shown in FIG. 7. The relay terminal device may include more or fewer components than those shown in the figure, or combine some of the components, or arrange the components differently.

The processor 410 is configured to: determine data information of to-be-transmitted data, where the to-be-transmitted data is data which is about to be sent by a remote terminal device to a network device through the relay terminal device; generate a target buffer status report based on the data information, where the target buffer status report is a to-be-sent buffer status report; and report the target buffer status report to the network device.

In this embodiment of the present disclosure, after determining the data information of the to-be-transmitted data that the remote terminal device is about to send to the network device through the relay terminal device, the relay terminal device can generate a to-be-sent buffer status report based on the data information, and report the to-be-sent buffer status report to the network device, so as to request, before receiving the to-be-transmitted data, the network device to pre-allocate an uplink resource corresponding to the to-be-transmitted data to the relay terminal device based on the to-be-sent buffer status report, so that the relay terminal device can complete the reporting of the buffer status of the to-be-transmitted data before the remote terminal device buffers the to-be-transmitted data in the relay terminal device. This reduces a delay in reporting the buffer status of the to-be-transmitted data by the relay terminal device, thereby reducing a data transmission delay and improving data transmission efficiency.

It should be understood that in this embodiment of the present disclosure, the radio frequency unit 401 may be configured to receive and send a signal during sending and receiving information or a call process. Specifically, the radio frequency unit 401 sends downlink information received from a base station to the processor 410 for processing, and in addition, sends uplink data to the base station. Generally, the radio frequency unit 401 includes but is not limited to an antenna, at least one amplifier, a transceiver, a coupler, a low noise amplifier, a duplexer, and the like. In addition, the radio frequency unit 401 may also communicate with a network and other devices via a wireless communications system.

The relay terminal device provides the user with wireless broadband Internet access by using the network module 402, for example, helping the user send or receive an email, browse a web page, and access streaming media.

The audio output unit 403 may convert audio data received by the radio frequency unit 401 or the network module 402 or stored in the memory 409 into an audio signal and output the audio signal as a sound. In addition, the audio output unit 403 may also provide audio output (for example, a call signal received sound or a message received sound) associated with a specific function performed by the relay terminal device 400. The audio output unit 403 includes a speaker, a buzzer, a receiver, and the like.

The input unit 404 is configured to receive an audio or video signal. The input unit 404 may include a graphics processing unit (Graphics Processing Unit, GPU) 4041 and a microphone 4042, and the graphics processing unit 4041 processes image data of a static picture or a video obtained by an image capture apparatus (for example, a camera) in an image capture mode or a video capture mode. A processed image frame may be displayed on the display unit 406. The image frame processed by the graphics processing unit 4041 may be stored in the memory 409 (or another storage medium) or transmitted by using the radio frequency unit 401 or the network module 402. The microphone 4042 can receive sounds and process such sounds into audio data. The processed audio data can be converted in a telephone call mode into a format that can be transmitted by the radio frequency unit 401 to a mobile communication base station, for outputting.

The relay terminal device 400 further includes at least one sensor 405, for example, an optical sensor, a motion sensor, and other sensors. Specifically, the optical sensor includes an ambient light sensor and a proximity sensor. The ambient light sensor may adjust brightness of a display panel 4061 based on intensity of ambient light. When the relay terminal device 400 moves near an ear, the proximity sensor may disable the display panel 4061 and/or backlight. As a motion sensor, an accelerometer sensor may detect magnitudes of accelerations in various directions (typically three axes), and in a stationary state, may detect the magnitude and direction of gravity, and may be applied for posture recognition of the relay terminal device (for example, switching between a landscape orientation and a portrait orientation, related gaming, and magnetometer posture calibration), vibration recognition related functions (for example, pedometer and tapping), and the like. The sensor 405 may further include a fingerprint sensor, a pressure sensor, an iris sensor, a molecular sensor, a gyroscope, a barometer, a hygrometer, a thermometer, an infrared sensor, and the like. Details are not described herein.

The display unit 406 is configured to display information input by the user or information provided to the user. The display unit 406 may include the display panel 4061. Optionally, the display panel 4061 may be configured in a form of a liquid crystal display (Liquid Crystal Display, LCD), an organic light-emitting diode (Organic Light-Emitting Diode, OLED), or the like.

The user input unit 407 may be configured to receive entered numerical or character information, and generate key signal input that is related to user setting and function control of the relay terminal device. Specifically, the user input unit 407 includes a touch panel 4071 and other input devices 4072. The touch panel 4071, or referred to as a touchscreen, may capture a touch operation performed by a user on or near the touch panel 4071 (for example, an operation performed by the user on the touch panel 4071 or near the touch panel 4071 by using any appropriate object or accessory such as a finger or a stylus). The touch panel 4071 may include two parts: a touch detection apparatus and a touch controller. The touch detection apparatus detects a touch direction of a user, detects a signal brought by a touch operation, and transmits the signal to the touch controller. The touch controller receives touch information from the touch detection apparatus, converts the touch information into touchpoint coordinates, transmits the touchpoint coordinates to the processor 410, and receives and executes a command transmitted by the processor 410. In addition, the touch panel 4071 may be implemented in multiple forms, for example, as a resistive, capacitive, infrared, or surface acoustic wave touch panel. In addition to the touch panel 4071, the user input unit 407 may further include other input devices 4072. Specifically, the other input devices 4072 may include but are not limited to a physical keyboard, a function key (for example, a volume control key or a power on/off key), a trackball, a mouse, and a joystick. Details are not described herein.

Further, the touch panel 4071 may cover the display panel 4061. After detecting a touch operation on or near the touch panel 4071, the touch panel 4071 transmits the touch operation to the processor 410 to determine a type of a touch event. Then the processor 410 provides corresponding visual output on the display panel 4061 based on the type of the touch event. Although the touch panel 4071 and the display panel 4061 are used as two separate components to implement input and output functions of the relay terminal device in FIG. 7, the touch panel 4071 and the display panel 4061 may be integrated to implement the input and output functions of the relay terminal device in some embodiments. This is not specifically limited herein.

The interface unit 408 is an interface for connecting an external apparatus to the relay terminal device 400. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 408 may be configured to receive an input (for example, data information or power) from an external apparatus and transmit the received input to one or more elements within the relay terminal device 400, or may be configured to transmit data between the relay terminal device 400 and the external apparatus.

The memory 409 may be configured to store software programs and various data. The memory 409 may mainly include a program storage area and a data storage area. The program storage area may store an operating system, an application program required for at least one function (for example, a sound play function and an image play function), and the like. The data storage area may store data created based on use of the mobile phone (for example, audio data and a phone book), and the like. In addition, the memory 409 may include a high-speed random access memory, or may further include a non-volatile memory, for example, at least one magnetic disk storage device, a flash memory, or another volatile solid-state storage device.

The processor 410 is a control center of the relay terminal device. The processor 410 uses various interfaces and lines to connect all parts of the entire relay terminal device, and performs various functions and data processing of the relay terminal device by running or executing the software program and/or module stored in the memory 409 and invoking data stored in the memory 409, thereby performing overall monitoring on the relay terminal device. The processor 410 may include one or more processing units. Preferably, the processor 410 may integrate an application processor and a modem processor. The application processor mainly processes the operating system, a user interface, an application program, and the like. The modem processor mainly processes wireless communication. It can be understood that the modem processor may alternatively be not integrated in the processor 410.

The relay terminal device 400 may further include the power supply 411 (for example, a battery) for powering the various components. Preferably, the power supply 411 may be logically connected to the processor 410 through a power management system, so that functions such as charge and discharge management and power consumption management are implemented by using the power management system.

In addition, the relay terminal device 400 includes some functional modules that are not shown. Details are not described herein.

Preferably, an embodiment of the present disclosure further provides a relay terminal device, including a processor 410, a memory 409, and a computer program stored in the memory 409 and capable of running on the processor 410. When the computer program is executed by the processor 410, the processes of the foregoing buffer status reporting method embodiment are implemented, with the same technical effects achieved. To avoid repetition, details are not described herein again.

An embodiment of the present disclosure further provides a computer-readable storage medium, where the computer-readable storage medium stores a computer program. When the computer program is executed by a processor, the processes of the foregoing buffer status reporting method embodiment are implemented, with the same technical effects achieved. To avoid repetition, details are not described herein again. The computer-readable storage medium may include a non-transitory computer-readable storage medium such as a read-only memory (Read-Only Memory, ROM), a random access memory (Random Access Memory, RAM), a magnetic disk, or an optical disc.

It should be noted that in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing embodiments, persons skilled in the art can clearly understand that the method in the foregoing embodiments may be implemented by software in addition to a necessary universal hardware platform or by hardware only. In most cases, the former is a preferred implementation. Based on such an understanding, the technical solutions of the present disclosure essentially, or the part contributing to the prior art may be implemented in a form of a software product. The software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of the present disclosure.

The various aspects of this application have been described above with reference to the flowcharts and/or block diagrams of the method, the apparatus (system), and the computer program product according to the embodiments of this application. It should be understood that each block in the flowcharts and/or block diagrams and a combination of blocks in the flowcharts and/or block diagrams can be implemented by computer program instructions. These computer program instructions can be provided to a processor of a general-purpose computer, a dedicated computer, or another programmable data processing apparatus to produce a machine, so that these instructions executed by the processor of the computer or another programmable data processing apparatus enable the implementation of the functions/actions specified in one or more blocks of the flowchart and/or block diagram. Such processor may be, but is not limited to, a general-purpose processor, a dedicated processor, a special application processor, or a field programmable logic circuit. It should be also understood that each block in the block diagrams and/or the flowcharts and a combination of the blocks in the block diagrams and/or the flowcharts may be implemented by a dedicated hardware for executing a specified function or action or may be implemented by a combination of dedicated hardware and computer instructions.

The embodiments of the present disclosure are described above with reference to the accompanying drawings, but the present disclosure is not limited to these embodiments. The embodiments are only illustrative rather than restrictive. Inspired by the present disclosure, a person of ordinary skill in the art can still derive many variations without departing from the essence of the present disclosure and the protection scope of the claims. All these variations shall fall within the protection of the present disclosure.

What is claimed is:

1. A buffer status reporting method, applied to a relay terminal device, wherein the method comprises:
   determining data information of to-be-transmitted data, wherein the to-be-transmitted data is data which is about to be sent by a remote terminal device to a network device through the relay terminal device;
   generating a target buffer status report based on the data information, wherein the target buffer status report is a to-be-sent buffer status report; and
   reporting the target buffer status report to the network device;
   wherein the data information comprises a data size of the to-be-transmitted data and service information corresponding to the to-be-transmitted data, and the service information comprises logical channel group (LCG) information of the to-be-transmitted data on a sidelink interface or a service priority corresponding to the to-be-transmitted data;
   wherein the generating a target buffer status report based on the data information comprises:
   determining, according to a preset mapping relationship, a target LCG corresponding to the service information, wherein the target LCG is an LCG on an uplink interface of the relay terminal device;
   determining, based on the data size, a target buffer size corresponding to the target LCG; and
   generating the target buffer status report based on the target LCG and the target buffer size.

2. The method according to claim 1, wherein the determining data information of to-be-transmitted data comprises:
   when the remote terminal device is in a UE autonomous resource selection mode, determining the data information based on sidelink control information (SCI) sent by the remote terminal device; or
   when the relay terminal device has a sidelink resource scheduling function, determining the data information based on a sidelink buffer status report (sidelink BSR) reported by the remote terminal device; or
   when the relay terminal device has a sidelink resource scheduling function and the relay terminal device has sent a resource grant to the remote terminal device, determining the data information based on transmission information of data corresponding to the resource grant; or
   when the remote terminal device is in a scheduled-by-base-station mode, determining the data information based on detected scheduling information which is provided by base station for the remote terminal device.

3. The method according to claim 1, wherein the reporting the target buffer status report to the network device comprises:
   in a case that there is an available uplink resource corresponding to the target buffer status report, sending the target buffer status report to the network device by using the available uplink resource.

4. The method according to claim 1, wherein the reporting the target buffer status report to the network device comprises:
   in a case that there is no available uplink resource corresponding to the target buffer status report, sending an uplink scheduling request SR to the network device; and
   sending the target buffer status report to the network device on an allocated uplink resource, wherein the allocated uplink resource is an available uplink resource allocated by the network device to the relay terminal device based on the SR.

5. The method according to claim 3, wherein the available uplink resource comprises at least one of the following:
   a new uplink transmission resource; or
   an uplink resource for use by a logical channel that is not restrained from triggering the target buffer status report.

6. The method according to claim 1, wherein the target buffer status report comprises a media access control subheader MAC subheader, and the MAC subheader comprises a logical channel identity (LCID) field, wherein the LCID field comprises a first LCID value, and the first LCID value is used to indicate that the target buffer status report is a to-be-sent type of report; or the LCID field comprises a second LCID value or a third LCID value, the second LCID value is used to indicate that the target buffer status report is in a first report format, and the third LCID value is used to indicate that the target buffer status report is in a truncated first report format; or the LCID field comprises a fourth LCID value, a fifth LCID value, or a sixth LCID value, the fourth LCID value is used to indicate that the target buffer status report is in the first report format, the fifth LCID value is used to indicate that the target buffer status report is in the truncated first report format, and the sixth LCID value is used to indicate that the target buffer status report is in a second report format; or the LCID field comprises a seventh LCID value, an eighth LCID value, a ninth LCID value, or a tenth LCID value, the seventh LCID value is used to indicate that the target buffer status report is in the first report format, the eighth LCID value is used to indicate that the target buffer status report is in the truncated first report format, the ninth LCID value is used to indicate that the target buffer status report is in the second report format, and the tenth LCID value is used to indicate that the target buffer status report is in a truncated second report format; wherein a total report length corresponding to the first report format is greater than or equal to a total report length corresponding to the second report format.

7. The method according to claim 6, wherein the first report format comprises at least one of the following:

an LCG indication signal and an LCG buffer status, wherein the LCG indication signal is used to indicate whether each LCG has to-be-transmitted data, and the LCG buffer status is used to indicate a buffer size corresponding to the LCG having to-be-transmitted data; or at least two sets of report information, wherein each set of the report information comprises an LCG identity and an LCG buffer status, the LCG identity is used to indicate an LCG having to-be-transmitted data, and the LCG buffer status is used to indicate a buffer size corresponding to the LCG.

8. The method according to claim 6, wherein the second report format comprises:

one set of report information, wherein the set of the report information comprises an LCG identity and an LCG buffer status, the LCG identity is used to indicate an LCG having to-be-transmitted data, and the LCG buffer status is used to indicate a buffer size corresponding to the LCG.

9. The method according to claim 1, wherein the reporting the target buffer status report to the network device comprises:

determining a transmission priority of the target buffer status report according to a preset transmission priority rule; and reporting the target buffer status report to the network device based on the transmission priority.

10. The method according to claim 1, wherein before the determining data information of to-be-transmitted data, the method further comprises:

receiving report configuration information sent by the network device, wherein the report configuration information comprises an on-off configuration of the target buffer status report; wherein the generating a target buffer status report based on the data information comprises:

generating the target buffer status report based on the data information in the case that the on-off configuration is on.

11. The method according to claim 10, wherein the report configuration information further comprises a generation configuration of the target buffer status report; and the generating a target buffer status report based on the data information comprises:

generating the target buffer status report based on the data information and the on generation configuration.

12. The method according to claim 10, wherein the report configuration information further comprises a reporting configuration of the target buffer status report; and the reporting the target buffer status report to the network device comprises:

reporting the target buffer status report to the network device based on the reporting configuration.

13. A relay terminal device, comprising a processor, a memory, and a program stored in the memory and capable of running on the processor, wherein when the program is executed by the processor, the following steps are implemented:

determining data information of to-be-transmitted data, wherein the to-be-transmitted data is data which is about to be sent by a remote terminal device to a network device through the relay terminal device;

generating a target buffer status report based on the data information, wherein the target buffer status report is a to-be-sent buffer status report; and reporting the target buffer status report to the network device;

wherein the data information comprises a data size of the to-be-transmitted data and service information corresponding to the to-be-transmitted data, and the service information comprises logical channel group (LCG) information of the to-be-transmitted data on a sidelink interface or a service priority corresponding to the to-be-transmitted data;

wherein the generating a target buffer status report based on the data information comprises:

determining, according to a preset mapping relationship, a target LCG corresponding to the service information, wherein the target LCG is an LCG on an uplink interface of the relay terminal device;

determining, based on the data size, a target buffer size corresponding to the target LCG; and generating the target buffer status report based on the target LCG and the target buffer size.

14. The relay terminal device according to claim 13, wherein the determining data information of to-be-transmitted data comprises:

when the remote terminal device is in a UE autonomous resource selection mode, determining the data information based on sidelink control information (SCI) sent by the remote terminal device; or when the relay terminal device has a sidelink resource scheduling function, determining the data information based on a sidelink buffer status report (sidelink BSR) reported by the remote terminal device; or when the relay terminal device has a sidelink resource scheduling function and the relay terminal device has sent a resource grant to the remote terminal device, determining the data information based on transmission information of data corresponding to the resource grant; or when the remote terminal device is in a scheduled-by-base-station mode, determining the data information based on detected scheduling information which is provided by base station for the remote terminal device.

15. The relay terminal device according to claim 13, wherein:
the reporting the target buffer status report to the network device comprises: in a case that there is an available uplink resource corresponding to the target buffer status report, sending the target buffer status report to the network device by using the available uplink resource; or, the reporting the target buffer status report to the network device comprises:
in a case that there is no available uplink resource corresponding to the target buffer status report, sending an uplink scheduling request SR to the network device; and
sending the target buffer status report to the network device on an allocated uplink resource, wherein the allocated uplink resource is an available uplink resource allocated by the network device to the relay terminal device based on the SR.

16. The relay terminal device according to claim 13, wherein the target buffer status report comprises a media access control subheader MAC subheader, and the MAC subheader comprises a logical channel identity (LCID) field, wherein
the LCID field comprises a first LCID value, and the first LCID value is used to indicate that the target buffer status report is a to-be-sent type of report; or
the LCID field comprises a second LCID value or a third LCID value, the second LCID value is used to indicate that the target buffer status report is in a first report format, and the third LCID value is used to indicate that the target buffer status report is in a truncated first report format; or
the LCID field comprises a fourth LCID value, a fifth LCID value, or a sixth LCID value, the fourth LCID value is used to indicate that the target buffer status report is in the first report format, the fifth LCID value is used to indicate that the target buffer status report is in the truncated first report format, and the sixth LCID value is used to indicate that the target buffer status report is in a second report format; or
the LCID field comprises a seventh LCID value, an eighth LCID value, a ninth LCID value, or a tenth LCID value, the seventh LCID value is used to indicate that the target buffer status report is in the first report format, the eighth LCID value is used to indicate that the target buffer status report is in the truncated first report format, the ninth LCID value is used to indicate that the target buffer status report is in the second report format, and the tenth LCID value is used to indicate that the target buffer status report is in a truncated second report format; wherein
a total report length corresponding to the first report format is greater than or equal to a total report length corresponding to the second report format.

17. A non-transitory computer-readable storage medium, wherein the non-transitory computer-readable storage medium stores a program, and when the program is executed by a processor, the following steps are implemented:
determining data information of to-be-transmitted data, wherein the to-be-transmitted data is data which is about to be sent by a remote terminal device to a network device through a relay terminal device;
generating a target buffer status report based on the data information, wherein the target buffer status report is a to-be-sent buffer status report; and
reporting the target buffer status report to the network device;
wherein the data information comprises a data size of the to-be-transmitted data and service information corresponding to the to-be-transmitted data, and the service information comprises logical channel group (LCG) information of the to-be-transmitted data on a sidelink interface or a service priority corresponding to the to-be-transmitted data;
wherein the generating a target buffer status report based on the data information comprises:
determining, according to a preset mapping relationship, a target LCG corresponding to the service information, wherein the target LCG is an LCG on an uplink interface of the relay terminal device;
determining, based on the data size, a target buffer size corresponding to the target LCG; and
generating the target buffer status report based on the target LCG and the target buffer size.

18. The non-transitory computer-readable storage medium according to claim 17, wherein the determining data information of to-be-transmitted data comprises:
when the remote terminal device is in a UE autonomous resource selection mode, determining the data information based on sidelink control information (SCI) sent by the remote terminal device; or
when the relay terminal device has a sidelink resource scheduling function, determining the data information based on a sidelink buffer status report (sidelink BSR) reported by the remote terminal device; or
when the relay terminal device has a sidelink resource scheduling function and the relay terminal device has sent a resource grant to the remote terminal device, determining the data information based on transmission information of data corresponding to the resource grant; or
when the remote terminal device is in a scheduled-by-base-station mode, determining the data information based on detected scheduling information which is provided by base station for the remote terminal device.

19. The non-transitory computer-readable storage medium according to claim 17, wherein:
the reporting the target buffer status report to the network device comprises: in a case that there is an available uplink resource corresponding to the target buffer status report, sending the target buffer status report to the network device by using the available uplink resource; or, the reporting the target buffer status report to the network device comprises:
in a case that there is no available uplink resource corresponding to the target buffer status report, sending an uplink scheduling request SR to the network device; and
sending the target buffer status report to the network device on an allocated uplink resource, wherein the allocated uplink resource is an available uplink resource allocated by the network device to the relay terminal device based on the SR.

20. The non-transitory computer-readable storage medium according to claim 17, wherein the target buffer status report comprises a media access control subheader MAC subheader, and the MAC subheader comprises a logical channel identity (LCID) field, wherein the LCID field comprises a first LCID value, and the first LCID value is used to indicate that the target buffer status report is a to-be-sent type of report; or the LCID field comprises a second LCID value or a third LCID value, the second LCID value is used to indicate that the target buffer status report is in a first report format, and the third LCID value is used to indicate that the target buffer status report is in a truncated first report format; or the LCID field comprises a fourth LCID value, a fifth LCID value, or a sixth LCID value, the fourth LCID value is used to indicate that the target buffer status report is in the first report format, the fifth LCID value is used to indicate that the target buffer status report is in the truncated first report format, and the sixth LCID value is used to indicate that the target buffer status report is in a second report format; or the LCID field comprises a seventh LCID value, an eighth LCID value, a ninth LCID value, or a tenth LCID value, the seventh LCID value is used to indicate that the target buffer status report is in the first report format, the eighth LCID value is used to indicate that the target buffer status report is in the truncated first report format, the ninth LCID value is used to indicate that the target buffer status report is in the second report format, and the tenth LCID value is used to indicate that the target buffer status report is in a truncated second report format; wherein a total report length corresponding to the first report format is greater than or equal to a total report length corresponding to the second report format.

\* \* \* \* \*